A. WASHBURN.
COTTON GIN GRATE.
No. 2,133. Patented June 16, 1841.
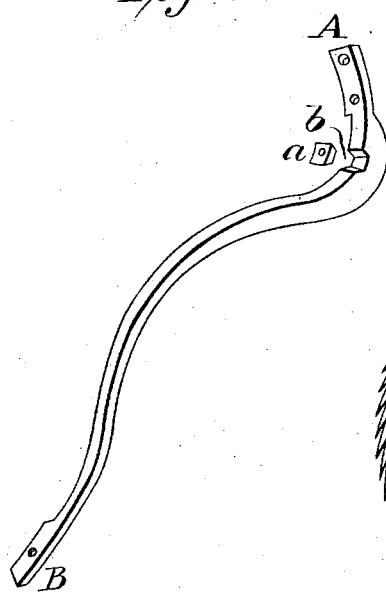
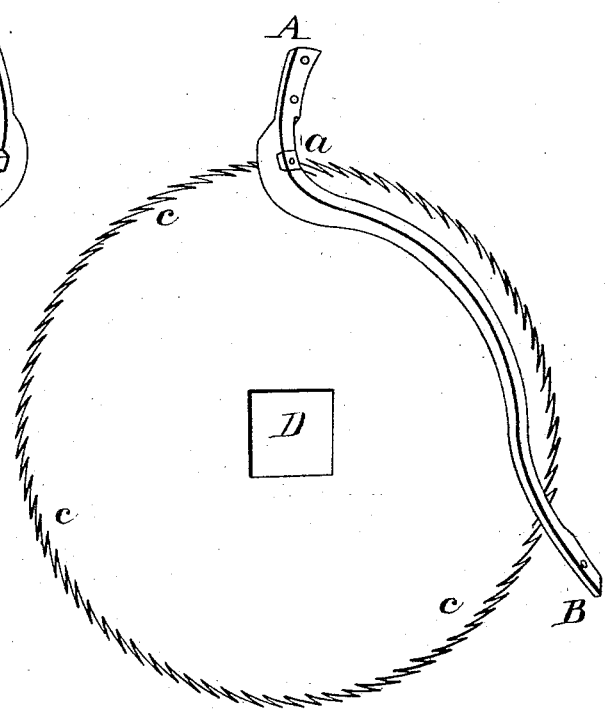
Witnesses:
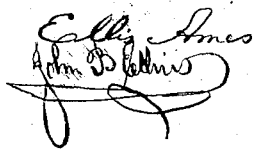
Inventor
Albert Washburn

UNITED STATES PATENT OFFICE.

ALBERT WASHBURN, OF BRIDGEWATER, MASSACHUSETTS.

IMPROVEMENT IN GRATES OF SAW-GINS FOR GINNING COTTON.

Specification forming part of Letters Patent No. 2,133, dated June 16, 1841.

*To all whom it may concern:*

Be it known that I, the undersigned, ALBERT WASHBURN, of Bridgewater, in the county of Plymouth and State of Massachusetts, manufacturer of cotton-gins, have invented a new and useful Improvement in the Mode of Constructing the Grates or Ribs of Cotton-Gins, called "Washburn's Improved Cotton-Gin Grate," of which the following is a full and exact description.

All the grates or ribs of the cotton-gins heretofore in use are in a short time rendered useless by the friction of the cotton where the tooth of the saw passes. The grates are then taken out of the machine and thrown aside and new ones put in their place, or the old ones mended up at much expense. Under my improvement the grates or ribs are never to be removed from the machine, as they will last as long as the machine itself. My mode of constructing the grate is this: At the point in the grate where the tooth of the saw passes, on the original formation of the grate, I make a groove extending across the face of the grate. The groove may be from an inch to one-half inch wide, and about one-quarter of an inch deep into the grate. Then a piece of metallic substance or glass, or hard wood, or horn, or other similar substance is fitted into the groove and fastened by a screw or rivet passing through the grate from the face to the back. On the wearing out by friction of this metallic substance or glass other pieces, of which a supply may be made at the original formation of the machine, may be easily inserted by removing the worn-out piece and inserting a new one. The friction does not ordinarily extend into the grate from the front more than one-quarter of an inch. By inserting a new piece on the wearing out of the one previously in the grate is as good as a new one. This groove may be made and pieces inserted on the sides; but one groove and piece in front are equal to two pieces on the sides.

Reference is to be had to the annexed drawing and explanation thereof, signed by myself and witnessed by John B. Ellms and Ellis Ames, as part and parcel of this my specification.

What I claim as my invention, and desire to secure by Letters Patent, is—

The application of the aforenamed metallic substance, or glass or hard wood or horn, or other similar substance by the groove into the gin-grate where the tooth of the saw passes, which substance is removable at pleasure when impaired by friction and supplied by a new one, whereby there is no necessity of removing the gin-grate from the machine.

ALBERT WASHBURN.

Witnesses:
ELLIS AMES,
JOHN B. ELLMS.